United States Patent [19]

Marble

[11] Patent Number: 5,676,778
[45] Date of Patent: Oct. 14, 1997

[54] METHOD OF MANUFACTURING A FILTER ASSEMBLY AND THE FILTER ASSEMBLY PRODUCED THEREBY

[75] Inventor: Keith Stewart Marble, Smith Falls, Canada

[73] Assignee: The Racal Corporation Canada Inc., Mississauga, Canada

[21] Appl. No.: 524,356

[22] Filed: Sep. 5, 1995

[51] Int. Cl.$^6$ .................................................. B29C 65/08
[52] U.S. Cl. ....................... 156/73.1; 156/202; 156/204; 156/227; 156/580.1
[58] Field of Search ......................... 156/73.1, 73.4, 156/202, 204, 227, 580.1; 210/445, 446

[56] References Cited

U.S. PATENT DOCUMENTS

| | | | |
|---|---|---|---|
| 1,832,281 | 11/1931 | Davies | 55/497 |
| 3,392,846 | 7/1968 | Getzin | 210/485 |
| 3,397,518 | 8/1968 | Rogers | 55/497 |
| 3,765,536 | 10/1973 | Rosenberg | 210/446 |
| 3,765,537 | 10/1973 | Rosenberg | 210/446 |
| 3,815,754 | 6/1974 | Rosenberg | 210/445 |
| 3,873,288 | 3/1975 | Wachter et al. | 55/497 |
| 4,169,059 | 9/1979 | Storms | 210/493.1 |
| 4,187,182 | 2/1980 | Rosenberg | 210/445 |
| 4,479,874 | 10/1984 | Rosenberg et al. | 210/445 |
| 5,167,740 | 12/1992 | Michaelis et al. | 156/73.1 |
| 5,215,609 | 6/1993 | Sanders | 156/70 |
| 5,376,270 | 12/1994 | Spearman | 210/445 |
| 5,489,352 | 2/1996 | Spearman | 156/69 |

FOREIGN PATENT DOCUMENTS

| | | |
|---|---|---|
| 170643 | 2/1986 | European Pat. Off. . |
| 1334612 | 7/1963 | France . |
| 2231409 | 12/1974 | France . |
| 4039288A1 | 6/1992 | Germany . |
| 4340942A1 | 6/1995 | Germany . |
| WO9534367A1 | 12/1995 | WIPO . |

*Primary Examiner*—James Sells
*Attorney, Agent, or Firm*—Pedro P. Hernandez

[57] ABSTRACT

The present invention provides for a method of manufacturing a filter assembly having a filter frame member (402) and the filter assembly (500) produced thereby. The method includes the step of supporting a filter media (202) preferably using a pair of support members (102 and 204). The support members (102 and 204) hold the filter media in place and allow portions of the filter media (202) to be exposed around the media's periphery. Next, a filter support frame (402) is placed around and in proximity to the exposed filter media. The filter support frame (402) is then welded, preferably ultrasonically, to the exposed portions of the filter media. Once welded, the pleated filter assembly is removed from the support members (102 and 204).

18 Claims, 6 Drawing Sheets

5,676,778

METHOD OF MANUFACTURING A FILTER ASSEMBLY AND THE FILTER ASSEMBLY PRODUCED THEREBY

FIELD OF THE INVENTION

This invention relates in general to the field of filters, such as air and gas filters and more particularly to a method of manufacturing a filter assembly having a rigid support frame and the filter assembly produced thereby.

BACKGROUND OF THE INVENTION

Traditional methods of bonding filter media to a filter support frame element include the use of adhesives such as urethane and the use of hot melt techniques. A typical urethane technique uses a filter frame element which in cross section, is a "U" shaped trough. Adhesive is poured into this trough and the pleated filter media is inserted in the adhesive and held in place until the adhesive sets. The edges of the first and last pleats may then be glued to the frame using a hot melt glue or similar adhesive. Although there are a large variety of adhesive methods used in the filter industry, they are in general, labor intensive, not easily automated, and quite messy. Furthermore, the filters thus produced may be undesirable from an environmental standpoint and the resulting filter assembly may be limited to relatively low temperature applications depending on the adhesive used to bond the filter media.

Another technique known in the art for attaching a filter support frame to filter media is by insert molding the filter media to the support frame. When using this manufacturing technique, the pleated filter assembly is inserted into a plastic injection mold tool, the tool is closed and a support frame is molded around the filter media. Injection molding although sometimes a good alternative for high volume filter operations has a few shortcomings. The capital investment for an injection molding machine and support equipment is large. Furthermore, as most filter media are highly porous in nature, special considerations must be given in the design and operation of the mold and the manufacturing processes involved in order to minimize leakage of molten plastic into the filter media during manufacturing. Framed filters manufactured by insert molding typically tend to have some leakage in the pleat area close to where the pleated filter media contacts the support frame. Such leakage of plastic tends to diminish the filtering capability of the finished filter assembly.

Finally, in U.S. Pat. No. 5,376,270, a pair of filter media end walls are inserted into a tongue and groove arrangement which are part of the filter housing prior to the filter media end walls being welded. The tongue and groove arrangement helps retain the filter media in place when the filter housing is snapped together. Once retained, the filter media is welded to the filter housing. The retention technique shown in U.S. Pat. No. 5,376,270 although beneficial in some respects, requires not only increased manufacturing expense due to the extra tongue and groove arrangement which is a required part of the filter housing, but also requires careful insertion and alignment of the filter media ends into the tongue and groove arrangement. In addition, the filter housing has to be unnecessarily enlarged to accommodate the tongue and groove arrangement.

A need thus exists in the art for a filter assembly and a method of manufacturing a filter assembly having a support frame which is cost effective and avoids the problems associated with the prior art mentioned above. A process which would allow for wider variations in both product design and process parameters would also be welcomed.

SUMMARY OF THE INVENTION

The present invention provides for a cost effective filter assembly, and for a method of attaching a filter support frame to a filter media which requires no adhesives and yet avoids the high capital investment and leakage problems associated with insert molding techniques. The sawtooth structure of the support forms used in the preferred embodiment guarantees uniform pleat spacing across the face of the filter during manufacturing. The process described by the present invention is simple to perform and well suited for automation. The process includes the steps of: placing a filter media on a support member such that a portion of the filter media is overhanging the support member, locating a filter frame member in proximity to the overhanging portion of the filter media, and welding the filter frame member to the exposed portion of the filter media.

DETAILED DESCRIPTION OF THE PREFERRED EMBODIMENT

Figure 1:
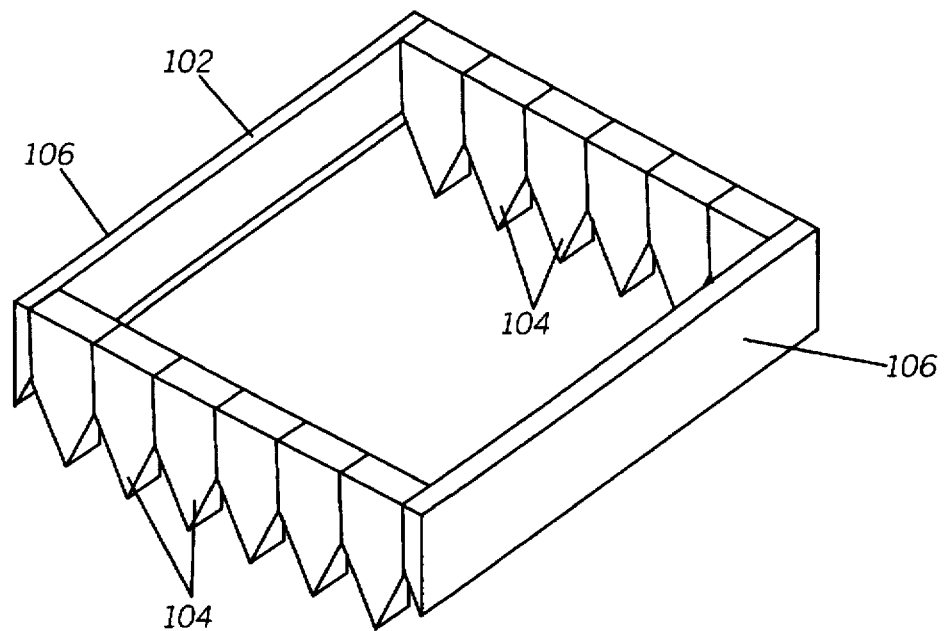
FIG. 1 shows a top support member in accordance with the present invention.

Referring to the drawings and in particular to FIG. 1, there is shown a first support member or top form 102 used in the manufacture of the filter assembly of the preferred embodiment. Top form 102 includes a plurality of sawtooth elements 104 and flat side edges 106. Top form 102 is preferably manufactured from a metal such as aluminum or a metal alloy, although other materials known in the art can also be used.

Figure 9:
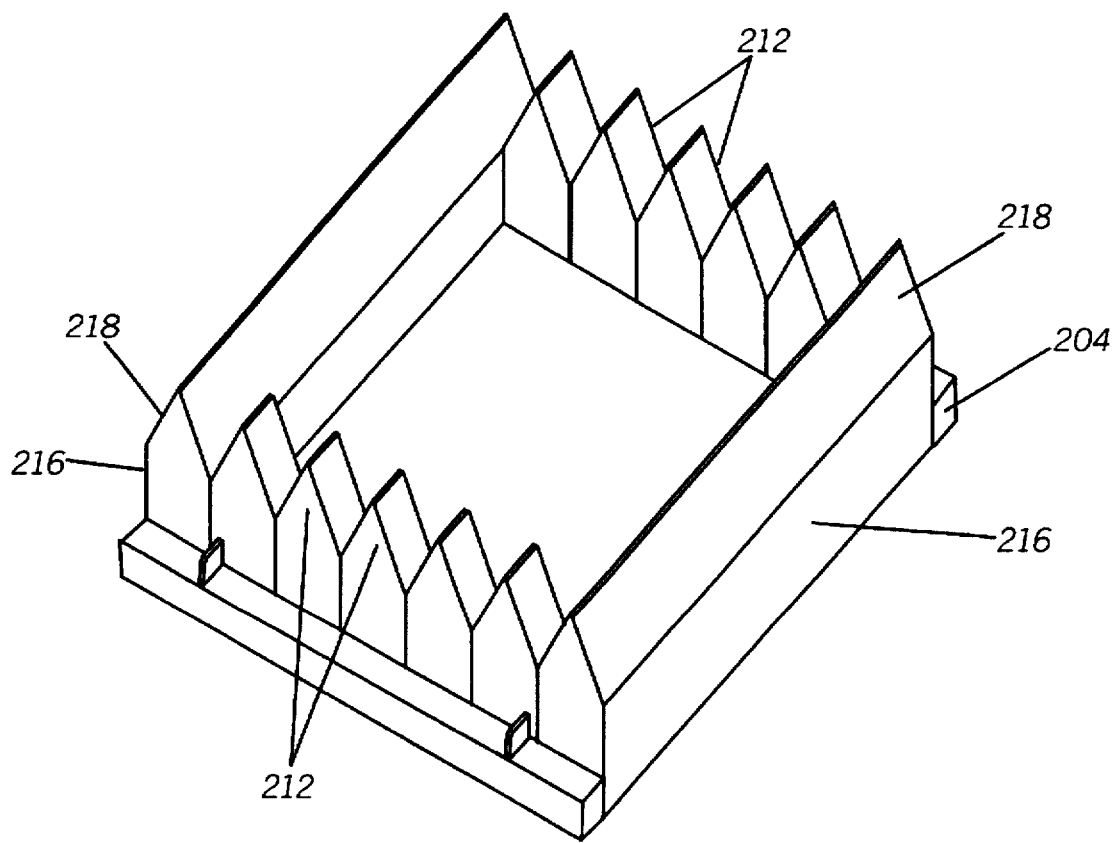
FIG. 9 shows the bottom support member which mates to the support member shown in FIG. 1.

A second support member or bottom (base) form 204 which mates to first support member 102 is shown in FIG. 9. Bottom form 204, which is similar and preferably formed from the same material as top form 102, also comprises a series of saw shaped teeth or elements 212. The number, length, width and height of teeth 104 and 212 conform to the desired configuration of the final filter assembly. Bottom form 204 further includes a set of support tabs 214 on each of the sawtooth end walls sides 210 which are used to support the filter support frame during manufacturing. Bottom form 204 also preferably includes flat surfaces 216 on each of the non-pleated end walls 218 below the last sawtooth edges 218.

Figure 2:
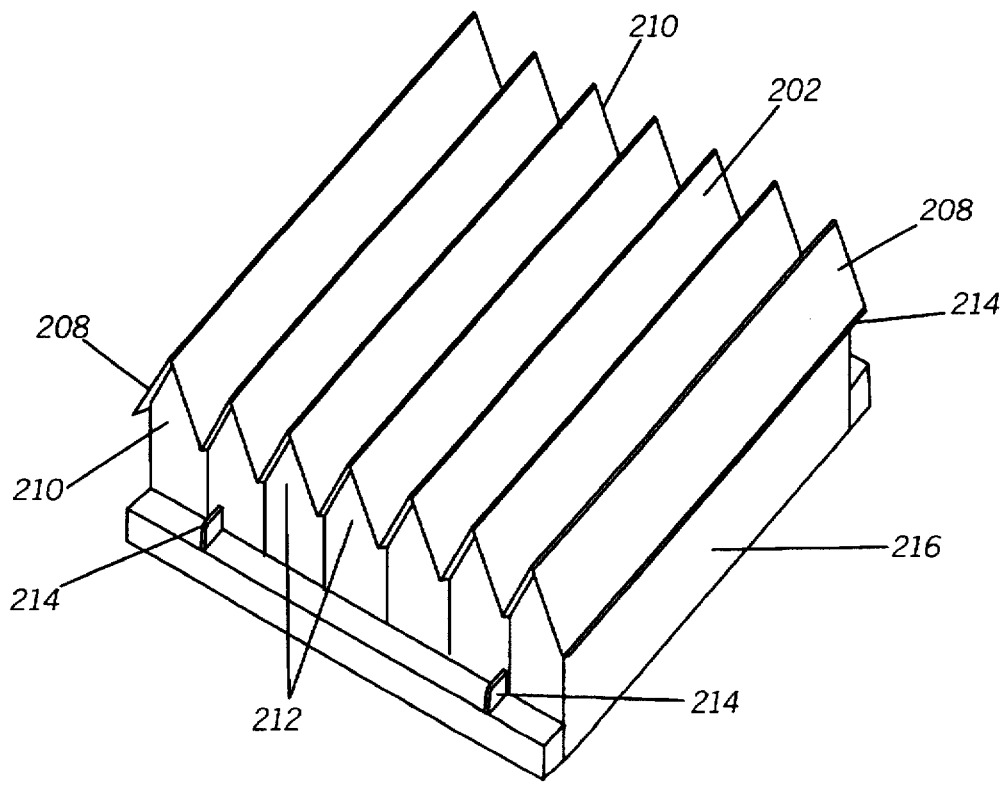
FIG. 2 shows a bottom support member including a pleated filter media in accordance with the invention.

In FIG. 2, the second support member or bottom (base) form 204 is shown with a pleated filter medium (media) 202 positioned on top of the plurality of sawtooth elements 212. The purpose of the bottom form 204 is to provide rigid support to the filter media 202 during manufacturing of the filter assembly. In the preferred embodiment, top form 102 includes one less sawtooth element 104 in order to allow for the non-pleated ends 208 of the filter media 202 to be exposed when the top and bottom forms are mated together. When mated together, the top and bottom sawtooth elements form substantially flat end walls 210.

The purpose of the top form 102 is to trap the filter media 202 against the bottom form 204 and keep it in place during attachment of the filter support frame. The plurality of sawtooth elements 104 when mated with the plurality of sawtooth elements 212 of bottom or base form 204 intermesh providing good retention of filter media 202.

Figure 3:
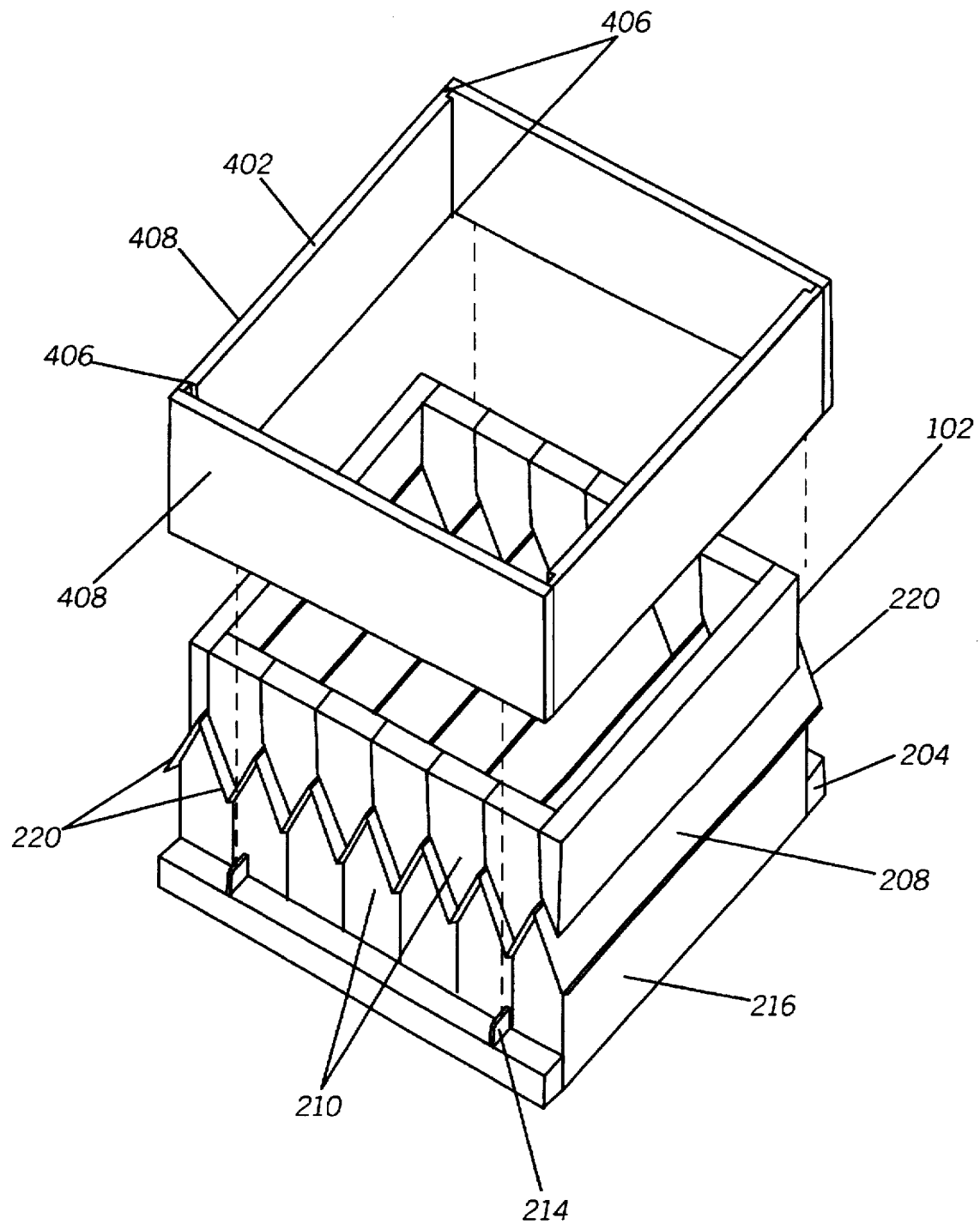
FIG. 3 shows the top and bottom support members pressed against each other retaining the pleated filter media in accordance with the invention.

In FIG. 3, the top and bottom forms 102, 204 are shown engaged with each other. Although not shown for ease of understanding of the present invention, top support member 102 is preferably pneumatically controlled when placed in a manufacturing environment. In the case of a multi-station manufacturing environment, base form 204 can act as a transport platform for the filter media 202 during manufacturing. For example, in a multi-station manufacturing environment, one manufacturing station can place and position the filter media 202 on base form 204, then base form 204 can be sent via a conveyance means such as a conveyor belt to another station for placement of the filter support frame 402, etc.

In the preferred embodiment, filter medium 202 comprises one or more layers of filter media material formed into a pleated structure. A specific number of pleats are cut and then trimmed to length. The pleat length of the filter assembly is greater than the length of the pleat in the finished filter assembly by approximately 0.318 to 0.953 centimeters (0.125 to 0.375 inch). This extra pleat length will provide for an exposed overhang 220 of filter media material along both pleated end walls 210.

The overhang 220 exposes filter media material from the sawtooth walls of the support members 102, 204. Preferably, the overhang 220 found on both pleated end sides are substantially equal to each other. The non-pleated ends 208 of filter media 202 are also exposed on each side of the support members as shown.

When the top and bottom forms 102, 204 are mated together, portions of all four sides of the filter media 202 are exposed. On the pleated ends, overhang material 220 is exposed, while on the non-pleated sides, the end pleats 208 are exposed on both sides. Having a portion of the filter media material 202 exposed around the entire periphery (perimeter) of the filter media 202, allows for the welding of the filter material 202 to a filter frame support member as will be discussed below.

During manufacture, the placement and alignment of the filter media 202 onto bottom support member 204 can be accomplished using an alignment tool (not shown) which is placed over the bottom support member (form) 204 during the time that the filter media 202 is being placed on top of the base member 204. The alignment tool can take the shape of a walled member which has no top or bottom walls, thereby allowing the filter media 202 to pass through it when it is being placed on top of the base form 204. The alignment of the filter media on top of the base form 204 can also be accomplished using a variety of other well known techniques, such as by using optical sensors or a vision system to determine the position of the filter media and then using alignment tools to properly position the filter media, using robotic techniques, etc.

Once the filter media is properly positioned on top of base form 204, top form 102 is pressed against the base form 204 in order to seat the filter media 202 into base form 204. The plurality of spaced teeth 212 found on base form 204 provide proper spacing and support for the filter media pleats during manufacture of the filter assembly. Once the filter media 202 is properly seated on base form 204, filter media 202 will not tend to shift during manufacturing.

Figure 4:
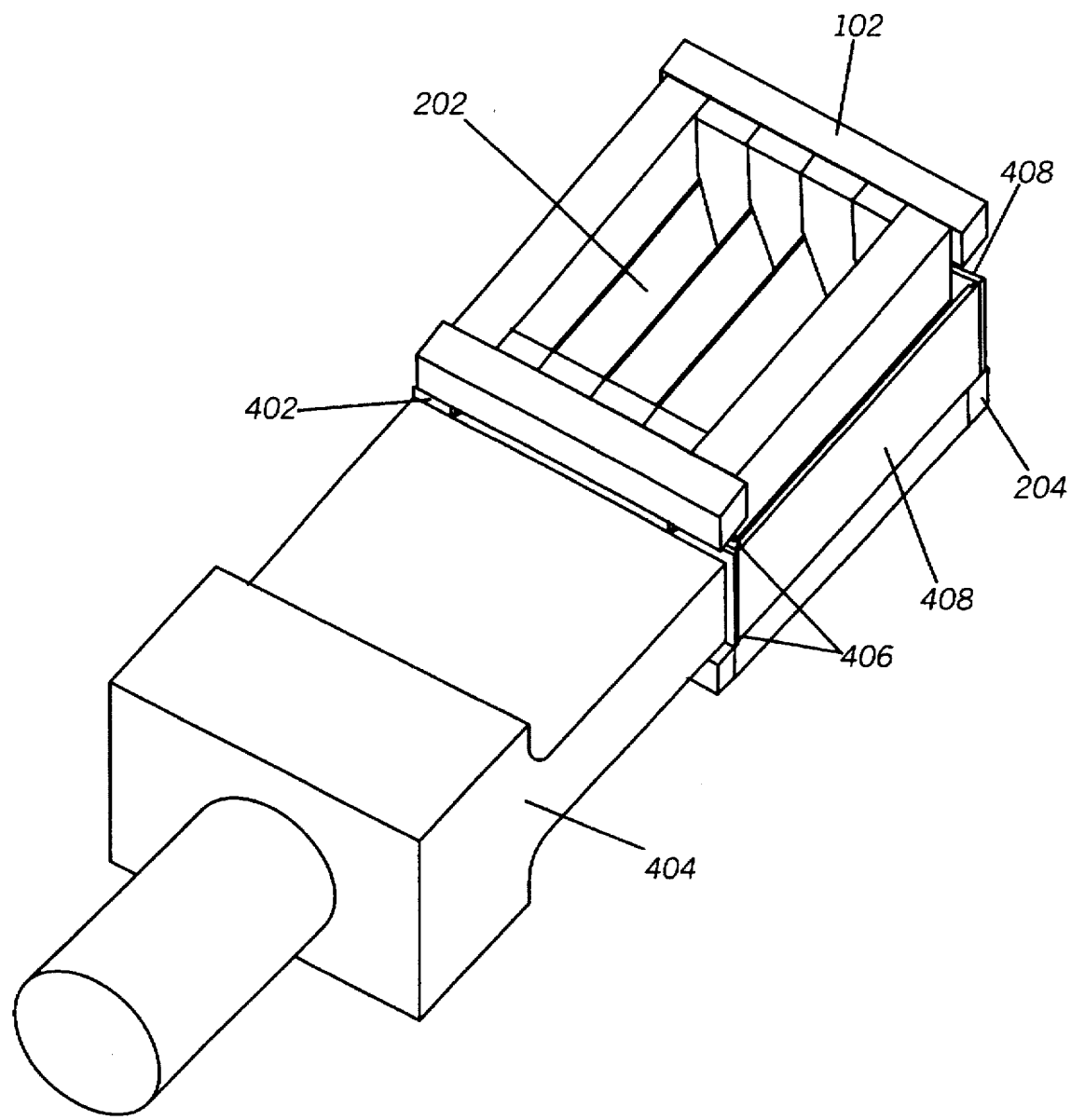
FIG. 4 shows an ultrasonic horn welding one side of the pleated filter media to a filter frame in accordance with the invention.

Upon the filter media 202 being properly positioned and retained between the top and bottom forms 102, 204, top form 102 is temporarily raised and a filter support frame (filter frame member) 402 as shown in FIG. 4, is presented and positioned about the periphery of the filter media 202. The support frame rests on top of tabs 214 located on bottom form 204. Once the support frame is positioned, the top form 102 is again lowered against the bottom form 204. The procedure described above can be simplified by making top form 102 be a free floating element (i.e., not rigidly attached to a lift mechanism). If the top form 102 is free floating, the top form 102 can be seated in base form 204 either automatically (e.g., top form 102 is placed by a robotic arm onto the bottom form 204, etc.) or manually. The support frame 402 can then be passed over the forms once the two forms 102 and 204 are mated together. A pneumatic cylinder or similar device can provide clamping pressure against the top form 102 if it is free floating in order to ensure that the filter media 202 does not move during the welding process.

When in place, the support frame 402 is in proximity to the exposed filter media material around the entire perimeter of the filter media. Preferably, the support frame side panels (frame members) should be placed 1.27 centimeter (0.5 inch) or less from the exposed filter media material prior to the frame members being welded.

Filter support frame 402 is preferably formed from a single piece of molded polypropylene material or other weldable polymeric. Preferably, two thin connecting ribs 406 connect one frame member 408 to an adjacent frame member 408. The two connecting ribs 406 melt away during welding and cause the frame member 408 being welded to collapse towards the exposed filter media. In another embodiment, adjacent frame members 408 can be connected to each other by hinged edge portions which are molded thinner in thickness along the entire corner where adjacent frame members 408 meet.

The support frame 402 in the preferred embodiment is approximately 0.015 centimeter (0.006 inch) longer than the filter media 202 parallel to the pleated ends of filter media 202 in order for the support frame 402 to clear the filter media material. The dimensions of each frame member will depend on the size of the filter being manufactured, height of filter media, etc.

Since it is advantageous to minimize the length of the corner joints between adjoining frame members, in another embodiment of the present invention, the exposed pleated ends 220 are flattened against the flat face of the support frames 210 after the top form 102 has been positioned and prior to welding of the frame assembly. This may be accomplished in several ways. A simple heated plate or roller can be used to flatten the exposed overhanging pleated ends 220 in a random manner. If more control is desired, a heated plate with recessed trough to accept the overhanging filter medium 220 can center the pleat end over the interface between the top and bottom forms 102 and 204. By "flattening out" the overhanging pleated ends 220, the inside length of the frame would be minimized since it would only need to clear the compressed pleats at both ends. This will minimize the distance the frame members 408 are required to collapse during welding.

Once the support frame 402 is properly in place, the top support member (form) 102 is again mated to the bottom form 204 in the case were the top support is not free floating. Filter support frame 402 fits loosely between the retention tabs 214 located on both the top and bottom forms 102, 204. An ultrasonic horn 404 which is part of an ultrasonic welding system as well known in the art is then pressed horizontally against each of the frame members 408. When welding the frame members 408 which correspond to the overhanging pleated ends 220 of the filter media 202, the act of pressing the ultrasonic horn 404 against the frame member 408 causes the frame member to collapse and press against the overhang pleated material 220. Preferably, ultrasonic energy is simultaneously applied to the ultrasonic horn 404 while the horn 404 is being pressed against the support frame member 408.

Figure 8:
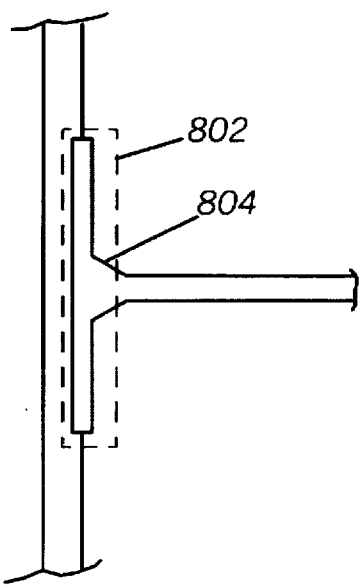
FIG. 8 shows a cross-sectional view of the welded joint produced by using the top and bottom forms having the chamfered edges as shown in FIG. 7.

The ultrasonic energy emitted via the ultrasonic horn 404 causes a weld to be formed between the pleated ends of the filter media and the corresponding inside surfaces of the frame members 408. The resulting weld resembles a "T" in cross section as shown in FIG. 8. The ultrasonic energy applied to the frame members 408 makes the thinner hinged edges 406 of the support frame 402 melt away. This allows the frame members 408 to collapse and become pressed against either the edge walls 210 on the pleated ends of the support frames or against the flat edge sides 216 on the non-pleated ends of the support frames.

In the case of some filter assemblies where the length of the frame side panels is longer than the width of the ultrasonic horn 404, the ultrasonic horn 404 can be repositioned in the manufacturing process and the welding process can then be repeated for that same side panel 408.

The above weld process steps are repeated for the other frame members 408. Preferably, the welding of opposite frame members 408 occurs substantially simultaneously using two welding horns 404. For example, both overhanging pleated ends 220 of the filter assembly are welded to the their respective frame members 408 simultaneously using a set of ultrasonic weld horns and both of the exposed non-pleated sides 208 of the filter media are then welded to their corresponding frame members simultaneously. The welding steps are repeated until all of the frame members are welded against their corresponding exposed filter media material. If faster manufacturing cycles are to be achieved, all four side panels can be welded simultaneously. After all of the frame members 408 are welded against the exposed surfaces of the filter media 202, the top form 102 is raised, and the finished filter assembly is removed.

Figure 5:
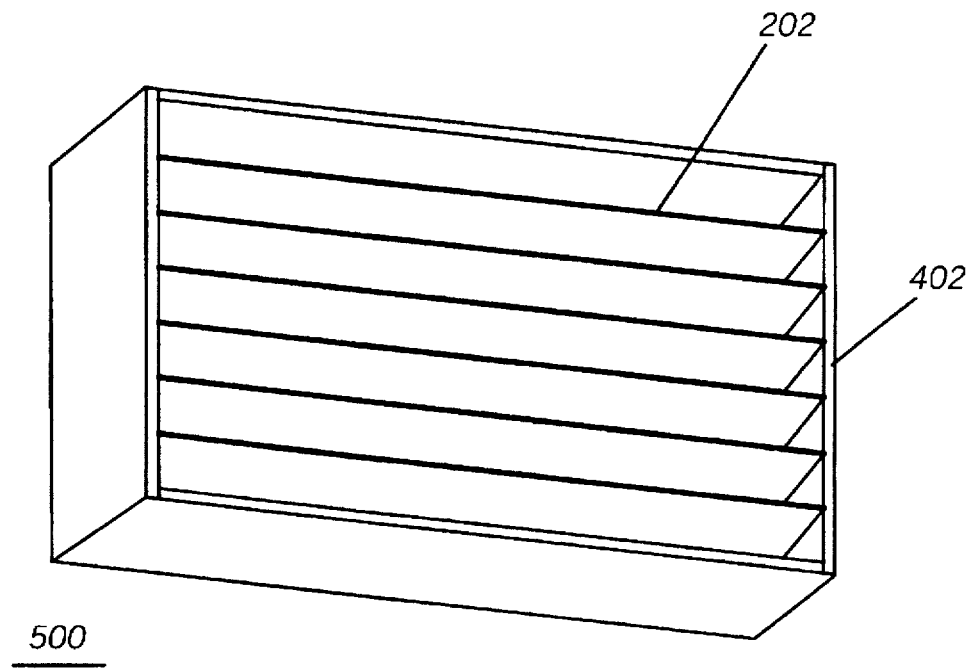
FIG. 5 shows a perspective view of a finished filter assembly in accordance with the present invention.
Figure 6:
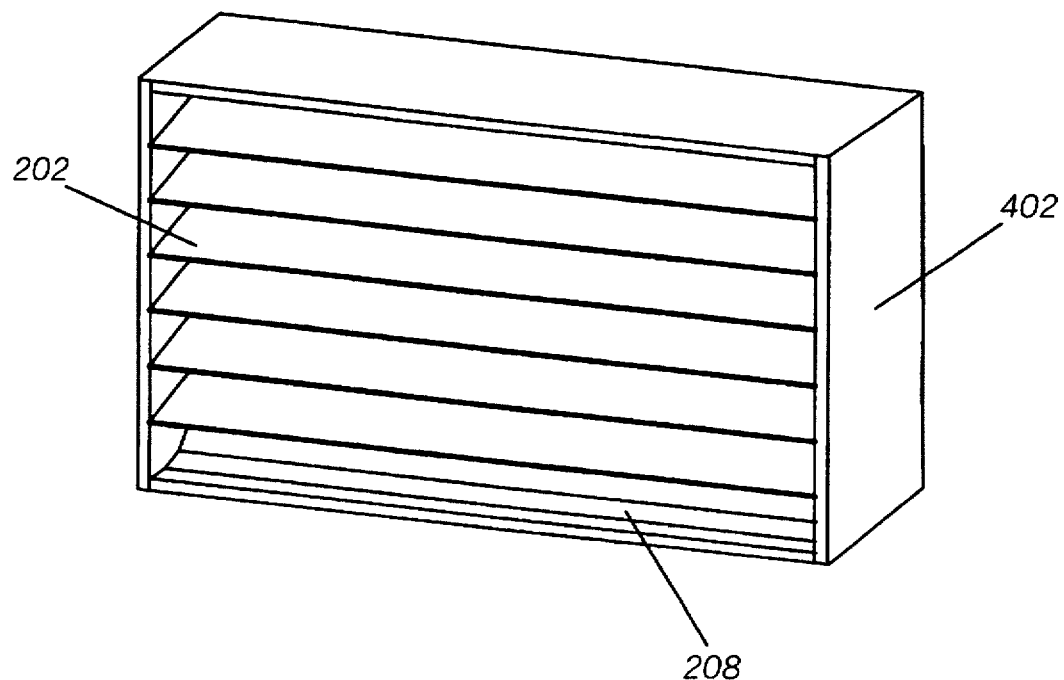
FIG. 6 shows a bottom perspective view of the finished filter assembly.

In FIG. 5 a top perspective view of a finished filter assembly 500 is shown. FIG. 6 shows a bottom perspective view of the filter assembly of FIG. 5. The finished filter assembly will exhibit an essentially leak-proof seal at the filter/frame junction along the entire periphery of the filter media. The filter assembly 500 produced in accordance with the present invention is suitable for use in filtering fluid streams comprised of water, air or other gases containing particulate or vapor contaminants.

Figure 7:
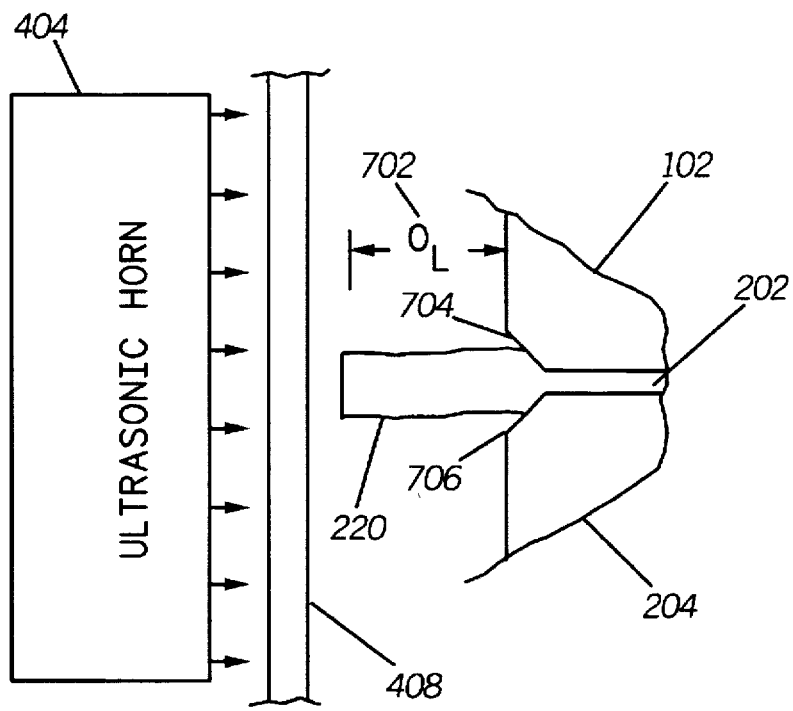
FIG. 7 shows a cross-sectional view of another embodiment of the present invention wherein the edges of the top and bottom forms are chamfered.

Referring to FIG. 7, there is shown a cross sectional view showing a portion of the overhanging filter medium 216 about to be welded to a portion of a frame member 408 using an ultrasonic horn 404. The welded portion is shown in FIG. 8. The strength of the weld is proportional, in part, to the width of the weld zone 802. This dimension develops from the amount of material available for welding, a combination of the bulk density (the thickness) and the length of the overhang ($O_L$) 702. The use of high density filter medium will require a smaller overhang length 702 than when using a filter medium having a low density. Similarly, material combinations of low or marginal compatibility can be compensated for by increasing the length of the overhang 702 along the pleated portions of the filter medium.

The material in the weld zone 802 is a composite of the frame material and the media material. It can be brittle and susceptible to cracking. To reduce this possibility, the corner edges of the top 102 and bottom 204 base forms are chamfered 706 and 704. For example, each of the top 102 and bottom 204 forms can be chamfered (45°×0.020 inch) along both sawtooth edge sides. This eliminates the sharp corner notch and provides for easier removal of the top form 102 and subsequent removal of the finished filter assembly from the bottom form 204. Using the chamfered top 102 and bottom 204 base forms as shown in FIG. 7 allows for a build-up of material 804 to occur at the weld joint as shown in FIG. 8. This build-up of material 804 further strengthens the weld joint. The filter media 202 once welded to the inner wall of the filter support frame 402 forms a substantially perpendicular plane to the inner wall of the filter support frame.

Although in the preferred embodiment, a filter support frame 402 having four integrated frame members 408 is used, the present invention can also be accomplished using individual frame members 408 for each side of the filter assembly. In this case, the individual frame members 408 are presented in proximity to the exposed filter media on the side to be welded. The individual frame members can be held in place by appropriate fixturing while the panels are being welded to the exposed filter media.

In traditional ultrasonic welding it is of fundamental importance that the materials to be welded be compatible with the process and each other. Although in the preferred embodiment of the invention a polypropylene frame material is used and a polypropylene filter medium is used, it is not necessary that all the materials used in the filter medium be identical to that used in the frame member or comprise a predominant amount of any one material compatible with ultrasonic welding. It is only necessary that a sufficient proportion of a compatible material be used in fabricating the filter medium such that once the fibers are blended to form the filter medium, the filter medium will exhibit compatibility. For example, a blend of fibers comprising 50% polypropylene fibers which are compatible with ultrasonic welding and 50% modacrylic fibers, which are not compatible with ultrasonic welding, may be woven together to produce a final filter medium which contains sufficient polypropylene to be rendered compatible with ultrasonic welding.

For filter media material which is not compatible with welding, a scrim material made from a compatible material can be layered over the noncompatible material. The only requirement of the materials chosen must be that they be able to form a strong sinter or bond such that the shape and physical properties of the component parts of the filter assembly are unaffected.

Other types of plastics such as single polymer, blends, or co-polymers can be used to form the support frame 402. The filtration medium 202 may be fabricated from single fiber or multiple fiber types, in any form such as woven, needlefelts, nonwoven, knitted, or laminated structures can also be utilized, although this invention should not be limited to these materials. It is also within the scope of this invention to use polystyrene, ABS, nylon, etc. all of which are materials compatible with ultrasonic welding.

The capital investment required by the present invention is fairly low. Unlike other known manufacturing techniques, the present invention can be used across a broad spectrum of pleat configurations, ranging from shallow pleats to tightly spaced, deep pleats. Simple flat ultrasonic welding horns can be used for side and end panels.

The process is suited to high volume production since multiple pleats can be welded simultaneously. Indexing along the support frame walls requires minimal ultrasonic horn movement, and accuracy is not critical. Experiments have shown that very high quality welds can be produced over a wide range of ultrasonic machine parameters.

While the invention has been described in conjunction with specific embodiments, it is evident that many alternatives, modifications, permutations and variations will become apparent to those skilled in the art in light of the foregoing description. For example, although in the preferred embodiment the filter assembly is ultrasonically welded, other welding techniques known in the art such as radio frequency welding, hot welding or any other suitable welding process can be utilized. Furthermore, the present invention can accommodate all form factors of filter assemblies (e.g., circular, square, trapezoidal etc.) besides the rectangular filter assembly shown in the preferred embodiment. For example, a circular filter assembly can be formed by using a circular frame member and a substantially circular filter media. Accordingly, it is intended that the present invention embrace all such alternatives, modifications and variations as fall within the scope of the appended claims.

What is claimed is:

1. A method of manufacturing a pleated filter assembly, comprising the steps of:
    placing a pleated filter media on a support member having side walls such that the pleated filter media is retained by the support member and a portion of the pleated filter media is overhanging from at least one of the side walls of the support member;
    locating a filter frame member having inner and outer walls in proximity to the overhanging portion of the pleated filter media;
    pressing the inner wall of the filter frame member against the overhanging portion of the pleated filter media; and
    welding the inner wall of the filter frame member to the overhanging portion of the pleated filter media such that the welding causes that portion of the filter frame member that is being welded to collapse against the filter media causing the pleated filter media to become welded against the inner wall of the filter frame member.

2. A method of manufacturing a filter assembly as defined in claim 1, wherein the welding step comprises ultrasonically welding the filter frame member to the overhanging portion of the filter media.

3. A method of manufacturing a filter assembly as defined in claim 1, wherein the welding step, comprises the sub-steps of:
    presenting a welding horn against the filter frame member such that the filter frame member is pressed against the overhanging portion of the filter media; and
    applying energy to the welding horn in order to weld the filter frame to the overhanging portion of the filter media.

4. A method of manufacturing a filter assembly as defined in claim 1, wherein the support member includes a plurality of teeth and the filter media includes a plurality of pleats, and the placing step comprises the step of:
    aligning the pleats of the filter media to the plurality of teeth found on the support member.

5. A method of manufacturing a filter assembly as defined in claim 3, wherein the support member comprises first and second support members and the placing step comprises the sub-steps of:
    placing the filter media on the first support member; and
    placing the second support member on top of the filter media such that the filter media is located between the first and second support frames.

6. A method of manufacturing a filter assembly as defined in claim 5, wherein the first and second support members have sawtooth edges and the sawtooth edges of the first support frame intermesh with the sawtooth edges of the second support frame when the second support frame is placed on top of the filter media.

7. A method of manufacturing a pleated filter assembly as defined in claim 1, wherein the inner wall of the filter frame member is substantially flat and the overhanging portion of the filter media which is being welded is a pleated end portion, and the welding step causes the pleated end portion to become welded to the flat inner wall of the filter frame member.

8. A method of manufacturing a pleated filter assembly as defined in claim 2, wherein the filter frame member is welded to the overhanging portion of the filter media using a welding horn which is moving parallel to the plane formed by the filter media.

9. A method of manufacturing a filter assembly, comprising the steps of:
    providing a pleated filter media having a periphery;
    placing the pleated filter media on a first support member;
    mating a second support member to the first support member such that the pleated filter media is located between the first and second support members and portions of the filter media periphery are exposed;
    presenting a filter frame having inner and outer walls to at least a portion of the exposed filter media; and
    welding the filter frame to the portion of the exposed filter media by pressing a welding horn against the outer wall of the filter frame such that the pleated filter media becomes welded to the inner wall of the filter frame and forms a plane which is substantially perpendicular to the inner wall of the filter frame.

10. A method as defined in claim 9, wherein the welding step comprises using ultrasonic welding.

11. A method as defined in claim 10, wherein the periphery of the filter media is substantially rectangular in shape having two pairs of opposing sides and the welding step comprises:
    welding the first pair of opposing sides of the filter media to the filter frame substantially simultaneously; and
    welding the second pair of opposed sides of the filter media substantially simultaneously to the filter frame after welding the first pair of opposing sides.

12. A method as defined in claim 9, wherein the first and second support members have chamfered corner edges which allow for a build-of material to occur at the weld joints during the welding of the filter support frame to the exposed filter media.

13. A method of manufacturing a filter assembly, comprising the steps of:

providing a support member having a periphery;

placing a pleated filter media on the support member so that a portion of the pleated filter media overhangs along the entire periphery of the support member;

aligning a collapsible filter support frame having inner and outer walls about the support member's periphery so that the portion of the pleated filter media which overhangs from the entire periphery of the support member is located in close proximity to the inner walls of the filter support frame;

pressing a welding tool against the outer walls of the filter support frame; and applying welding energy to the welding tool as it is being pressed against the outer walls of the filter support frame in order to collapse the filter support frame against the overhanging filter media and cause a weld to form between the inner walls of the filter support frame and the overhanging filter media.

14. A method as defined in claim 13, wherein the filter support frame comprises a plurality of filter frame members which are interconnected via corner joints which are thinner than the thickness of the filter frame members; and the thinner corner joints melt away during the welding of the filter frame members to the filter media.

15. A method of manufacturing a filter assembly, comprising the steps of:

providing a first support member having a plurality of teeth and side walls;

aligning a pleated filter media on the first support member such that the some of the pleats of the filter media rest on corresponding teeth on the first support member;

placing a collapsible filter frame around the side walls of the first support member;

providing a second support member having a plurality of teeth and side walls;

mating the second support member to the first support member such that the teeth on the first and second support members intermesh with each other and portions of the pleated filter media project from the first and second support member side walls around the entire periphery of the filter media;

welding at least a portion of the filter frame to at least a portion of the filter media which is projecting from the side walls of the first and second support members such that the welding causes that portion of the filter frame that is being welded to collapse towards the first and second support member side walls and against the portion of filter media.

16. A method as defined in claim 15, wherein the welding step comprises the steps of:

pressing an ultrasonic horn against at least a portion of the filter frame; and applying ultrasonic energy to the horn.

17. A method as defined in claim 15, wherein the first and second support members include four side walls and the filter frame includes four side panels attach to each other, one side panel is located along each of the support member side walls, and the step of pressing the ultrasonic horn comprises:

pressing the ultrasonic horn against a selected one of the side panels; and the step of applying ultrasonic energy causes the selected side panel to collapse against that portion of the projecting filter media which is being welded to the selected side panel.

18. A method of manufacturing a pleated filter assembly, comprising the steps of:

placing a pleated filter media on a support member having side walls such that the pleated filter media is retained by the support member and a portion of the pleated filter media is overhanging from at least one of the side walls of the support member;

locating a filter frame member having inner and outer walls in proximity to the overhanging portion of the pleated filter media;

pressing the inner wall of the filter frame member against the overhanging portion of the pleated filter media; and welding the inner wall of the filter frame member to the overhanging portion of the pleated filter media such that the pleated filter media forms a plane which is substantially perpendicular to the inner wall of the filter frame member.

* * * * *